E. McCLINTOCK.
SHOCK ABSORBER.
APPLICATION FILED NOV. 4, 1920.

1,404,458.

Patented Jan. 24, 1922.

Inventor
Edward McClintock

By Bradbury & Caswell
Attorneys

UNITED STATES PATENT OFFICE.

EDWARD McCLINTOCK, OF ST. PAUL, MINNESOTA.

SHOCK ABSORBER.

1,404,458.  Specification of Letters Patent.  Patented Jan. 24, 1922.

Application filed November 4, 1920. Serial No. 421,675.

*To all whom it may concern:*

Be it known that I, EDWARD McCLINTOCK, a citizen of the United States, residing at St. Paul, in the county of Ramsey and State of Minnesota, have invented a new and useful Shock Absorber, of which the following is a specification.

My invention relates to improvements in shock absorbers.

Its object is to provide a simple, durable and efficient device of this kind, which is pleasing in appearance and designed to be readily interposed between chassis members of an automobile.

In addition to softening jars and rebounds, my improved device serves also as a substitute for the ordinary spring shackle. As is well known, the common spring shackle is interposed between the chassis frame of an automobile and the end of a leaf spring, carried by the vehicle axle, or is interposed between the ends of leaf springs, one carried by the frame and the other by the axle, said shackle being employed to join the members attached thereto and being capable of pivotal movements to compensate for elongation of the spring elements under loads, or under longitudinal lurching movements. My device supplements the vertically yielding qualities of the spring members of the chassis and also serves to yieldingly compensate for relative longitudinal movements of the connected chassis members under horizontal thrusts of one with respect to the other.

With the foregoing and other objects in view, which will appear in the following description, the invention resides in the novel combination and arrangement of parts and in the details of construction hereinafter described and claimed.

Figure 1:
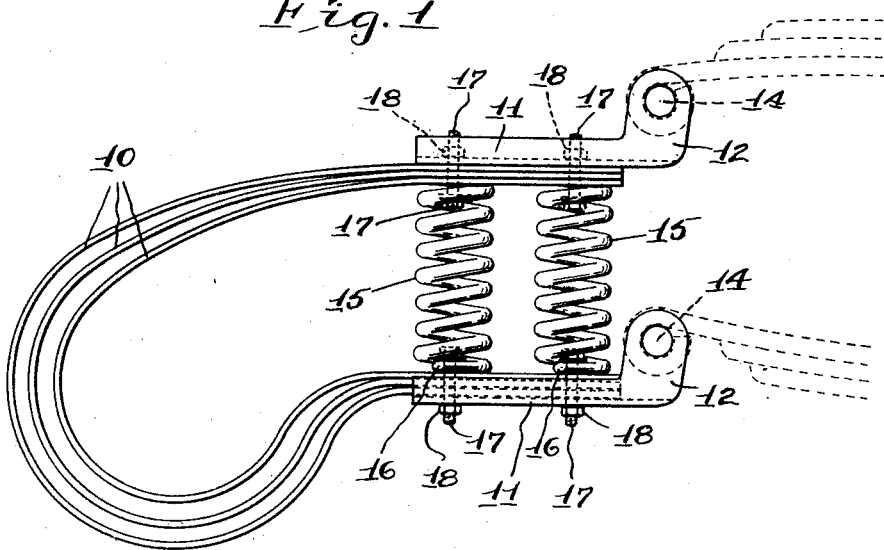
Figure 2:
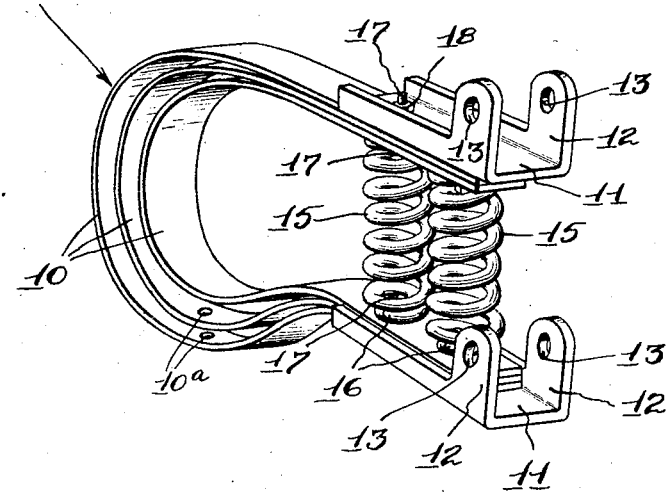

In the drawings, Fig. 1 is a side elevation of a device embodying my invention and is illustrated as applied to the ends of leaf springs constituting chassis members of a vehicle body, and Fig. 2 is a perspective view of said device.

Referring to the drawings, I have used the reference numeral 10 to designate looped nested springs. These springs 10 form a composite spring structure A, the terminals of said springs at either end of said structure being lapped one upon the other, while the turns of said springs are spaced apart one from the other, so as to avoid contact under ordinary conditions, when the ends of the spring structure A are sprung toward each other. Coupling plates 11, preferably U shaped in cross section to secure strength, are provided for each end of the spring structure, the forward ends of these plates being formed with opposed ears 12, perforated as at 13, to receive a connecting bolt or pin 14. Coiled springs 15 are interposed between the ends of the composite spring structure A. The extremity of each spring 15 is turned to form an eye 16 encircling the axis of the spring. Bolts 17, passing through said eyes 16 in said springs and through the ends of the looped springs 10 and also through the coupling plates 11, as shown, are supplied with nuts 18. These bolts 17 rigidly join the ends of the coiled springs 15 with the ends of the looped springs 10 and, further, rigidly unite the ends of said coiled and looped springs with said coupling plates 11. The springs 10 are preferably formed as shown in the drawings, the lower portions of the turns extending considerably beneath the lower ends of said springs. In applying my device, the upper coupling plate 11 is applied either to the chassis frame or to the end of a spring, carried by the frame, by the usual pin or bolt 14, employed in joining the upper end of the usual shackle clip with said member. The lower coupling plate 11 is connected in similar manner with the looped end of the usual companion leaf spring on the vehicle axle. These chassis members are subject to vertical movements toward and from each other under loads, shocks or jars and the points of connection between said members are subject to being shifted horizontally with respect to each other, due to elongation and contraction of the yielding chassis member or members. My coiled springs 15 primarily supplement the yielding chassis members, said coiled springs being compressed under weight or jars and stretched under recoils between the chassis members. The looped springs 10 primarily compensate for horizontal or longitudinal movements between the chassis members under forward or rearward lurching movements of one member with respect to the other. This action of said looped springs 10 is assisted by the coiled springs 15, which are rigidly attached at their ends to the ends of said looped springs, the resiliency of said coiled springs yieldingly resisting any force tending to bend them longitudinally. The action of the coiled springs 15 is in turn assisted by the looped springs 10, as will be readily observed. It will be noted that each looped spring joins in the action of the composite spring structure, each turn of each looped spring being movable freely and without contact with its adjacent spring or springs. This construction enhances the sensitiveness of the looped spring structure A, without sacrificing strength and, further, eliminates sheering strains against the connecting bolts 17, under ordinary circumstances, which sheering strains would otherwise occur, were the turns in said looped springs normally engaged one with the other. The clearance between the turns of the springs 10 has been slightly exaggerated in the drawing for the sake of clearness. In practice, this clearance is only sufficiently great to permit free movement of the turns, without contact, under ordinary conditions in travel. To more firmly resist extraordinarily heavy jars or jolts, I have provided for the engagement of the turns of said springs 10, when the coiled springs 15 are compressed to such an extent that the turns thereof are in close proximity. It will, therefore, be noted that the looped springs 10 have two phases of operativeness. In the first or normal phase, the turns of said springs 10 being separated, the composite spring structure A is very sensitive and yields considerably under comparatively light strains, while in the second phase, wherein the turns of said springs are in engagement, said spring structure is less resilient and yields through lesser distances under greater strains.

My improved device materially assists in absorbing light shocks and effectually minimizes the heavier shocks and lurches in travel.

I contemplate the use, when desired, of reinforcing leaves (not shown) within the inner turn of the spring structure A, said leaves being secured at their ends by the bolts 17. I further contemplate, for some purposes, the use of a single looped spring 10 and a single coiled spring 15, also the arrangement of two coiled springs 15 in position side by side instead of the arrangement of said springs as shown in the drawings. These changes and others in the specific form of my invention, as herein disclosed, may be made within the scope of what is claimed without departing from the spirit of my invention.

Having described my invention, what I claim as new and desire to secure by Letters Patent is:

1. The combination with two chassis members, movable toward and from one another and longitudinally with respect to each other, of a looped spring adapted to be attached at its ends to said members so as to yieldingly resist relative movement between them, and a coiled spring rigidly secured at its ends to the looped spring terminals near their points of connection with said chassis members, said coiled spring serving primarily to yieldingly resist movement of the chassis members toward and from each other, said looped spring serving primarily to yieldingly resist relative longitudinal movement of said members, both of said springs serving, further, to aid each other in their primary capacities.

2. In a device of the class described, a plurality of nested looped springs, the turns thereof being free from contact with each other, while the ends of said springs lap one upon the other, a coupling plate for each end of the composite spring structure attachable to one of two relatively movable chassis members, means for joining each plate with its adjacent spring terminals and a coiled spring interposed between the ends of said spring structure.

3. In a device of the class described, a plurality of nested looped springs, the turns thereof being normally free from contact with each other, while the ends of said springs lap one upon the other, a coupling plate for each end of the composite spring structure attachable to one of two relatively movable chassis members, means for joining each plate with its adjacent spring terminals and a coiled spring interposed between the ends of said spring structure, said turns of said looped springs engaging one another, when the ends of the looped spring structure are forced together sufficiently to approach the limit of compression of said coiled springs.

4. In a device of the class described, a plurality of nested looped springs, the turns thereof being spaced apart, a pair of coupling plates attachable to relatively movable chassis members, bolts connecting said plates with the ends of the composite spring structure, said bolts being passed through said plates and adjacent spring terminals, and coiled springs interposed between the ends of the composite spring structure, the ends of said coiled springs being secured to opposed bolts joining the adjacent spring terminals and coupling plates.

5. In a device of the class described, a plurality of nested looped springs, the turns thereof being normally free from contact with each other, the ends of said springs being lapped, one upon the other, and rigidly joined, and means for attaching the terminals of the looped spring structure to relatively movable chassis members.

In testimony whereof, I have signed my name to this specification.

EDWARD McCLINTOCK.